US007124266B1

(12) United States Patent
Harmer et al.

(10) Patent No.: US 7,124,266 B1
(45) Date of Patent: *Oct. 17, 2006

(54) LOCKING AND MEMORY ALLOCATION IN FILE SYSTEM CACHE

(75) Inventors: Craig K. Harmer, San Francisco, CA (US); Aalop Shah, Maharashtra (IN); Rahul Khona, San Jose, CA (US)

(73) Assignee: Veritas Operating Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/326,835

(22) Filed: Jan. 6, 2006

Related U.S. Application Data (63) Continuation of application No. 10/395,594, filed on Mar. 24, 2003, now Pat. No. 7,010,655.

(51) Int. Cl.
*G06F 12/00* (2006.01)
(52) U.S. Cl. .......................... 711/163; 707/8; 707/205; 718/104
(58) Field of Classification Search .................. None
See application file for complete search history.

(56) References Cited

U.S. PATENT DOCUMENTS

| 5,386,536 | A | | 1/1995 | Courts et al. | |
|---|---|---|---|---|---|
| 5,491,808 | A | * | 2/1996 | Geist, Jr. ................... | 711/100 |
| 5,636,360 | A | | 6/1997 | Courts et al. | |
| 5,680,573 | A | * | 10/1997 | Rubin et al. ................ | 711/129 |
| 5,893,140 | A | | 4/1999 | Vahalia et al. | |
| 5,948,062 | A | | 9/1999 | Tzelnic et al. | |
| 6,061,763 | A | * | 5/2000 | Rubin et al. ................ | 711/129 |
| 6,075,938 | A | | 6/2000 | Bugnion et al. | |
| 6,240,413 | B1 | | 5/2001 | Learmont | |
| 6,381,682 | B1 | * | 4/2002 | Noel et al. ................... | 711/153 |
| 6,389,513 | B1 | | 5/2002 | Closson | |
| 6,449,614 | B1 | | 9/2002 | Marcotte | |
| 6,601,070 | B1 | | 7/2003 | Zhang et al. | |
| 6,625,591 | B1 | | 9/2003 | Vahalia et al. | |
| 6,650,333 | B1 | * | 11/2003 | Baldwin ..................... | 345/552 |
| 6,772,255 | B1 | | 8/2004 | Daynes | |
| 2004/0107227 | A1 | | 6/2004 | Michael | |
| 2004/0133573 | A1 | | 7/2004 | Miloushev et al. | |
| 2004/0205304 | A1 | * | 10/2004 | McKenney et al. ......... | 711/148 |
| 2005/0114621 | A1 | * | 5/2005 | Lahiri et al. ................ | 711/170 |
| 2005/0235115 | A1 | * | 10/2005 | Franaszek et al. .......... | 711/133 |

OTHER PUBLICATIONS

Bonwick et al., "The Slab Allocator: An Object-Caching Kernel Memory Allocator," Sun Microsystems, 1994, (12 Pages).
Rik van Riel, "Linux MM: design for a zone based memory allocator," http://www.surriel.com/zone-alloc.html, Jul. 1998, (4 pages).
Ricardo Galli, "Journal File System in Linux," Open Source/Free Software: Towards Maturity, Novática and Informatik, UPGRADE vol. II, No. 6, Dec. 2001, pp. 50-56.
Hewlett-Packard Company, "Tunable Kernel Parameters," HP-UX Release 11i Version 1.6, Edition 2, 2000-2003, 76 pages.

* cited by examiner

*Primary Examiner*—Kevin Vergrugge
(74) *Attorney, Agent, or Firm*—Robert C. Kowert; Meyertons, Hood, Kivlin, Kowert & Goetzel, P.C.

(57) ABSTRACT

A method may involve assigning each of a plurality of freelists and a plurality of hashlists used to implement a cache to one of a plurality of lock groups and acquiring one of a plurality of locks. Objects on each freelist and hashlist that are assigned to the same lock group are allocated from the same one of a plurality of memory allocation pools. Each lock group is associated with a respective one of the plurality of locks. Acquiring the lock locks a freelist and several hashlists included in an associated lock group of the plurality of lock groups.

37 Claims, 6 Drawing Sheets

LOCKING AND MEMORY ALLOCATION IN FILE SYSTEM CACHE

This application is a continuation of U.S. patent application Ser. No. 10/395,594, entitled "Optimized Lock Management In File System Buffer Cache", filed Mar. 24, 2003 now U.S. Pat. No. 7,010,655.

BACKGROUND

1. Field of the Invention

This invention relates to file systems and, more particularly, to various caches used by file systems.

2. Description of the Related Art

File systems organize and manage information stored in a computer system. Typically, information is stored in the form of files. File systems may support the organization of user data by providing and tracking organizational structures such as folders or directories. The file system may interpret and access information physically stored in a variety of storage media, abstracting complexities associated with the tasks of locating, retrieving, and writing data to the storage media. In order to avoid having to access disk each time a file or its associated metadata is accessed, a file system may temporarily cache recently accessed file system information in a variety of caches within system memory.

SUMMARY

Various embodiments of systems and methods for implementing a cache are disclosed. In one embodiment, a method may involve assigning each of a plurality of freelists and a plurality of hashlists used to implement a cache to one of a plurality of lock groups and acquiring one of a plurality of locks. Objects on each freelist and hashlist that are assigned to the same lock group are allocated from the same one of a plurality of memory allocation pools. Each lock group is associated with a respective one of the plurality of locks. Acquiring the lock locks a freelist and several hashlists included in an associated lock group of the plurality of lock groups.

In some embodiments, such a method may also involve searching one of the hashlists in the lock group associated with the lock for an object and, if the object is found in the hashlist, acquiring a lock on the object by writing to a semaphore associated with the object, where write access to the semaphore is protected by the lock. The value of the semaphore may indicate whether the object is locked in a shared mode or an exclusive mode.

A method may also involve a cache memory manager requesting a plurality of slabs of memory from an operating system for use as part of the cache, where each of the plurality of slabs is a uniformly sized chunk of memory. The cache memory manager may subdivide each of the plurality of slabs of memory into one or more buffers and track which objects are included in each slab. The cache memory manager releasing memory back to the operating system in slabs such that if any object included in one of the plurality of slabs is released back to the operating system, all of the objects included in that one of the plurality of slabs are released back to the operating system. Each of the plurality of slabs may be assigned to one of the plurality of memory allocation pools so that each memory allocation pool includes a unique subset of the plurality of slabs.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
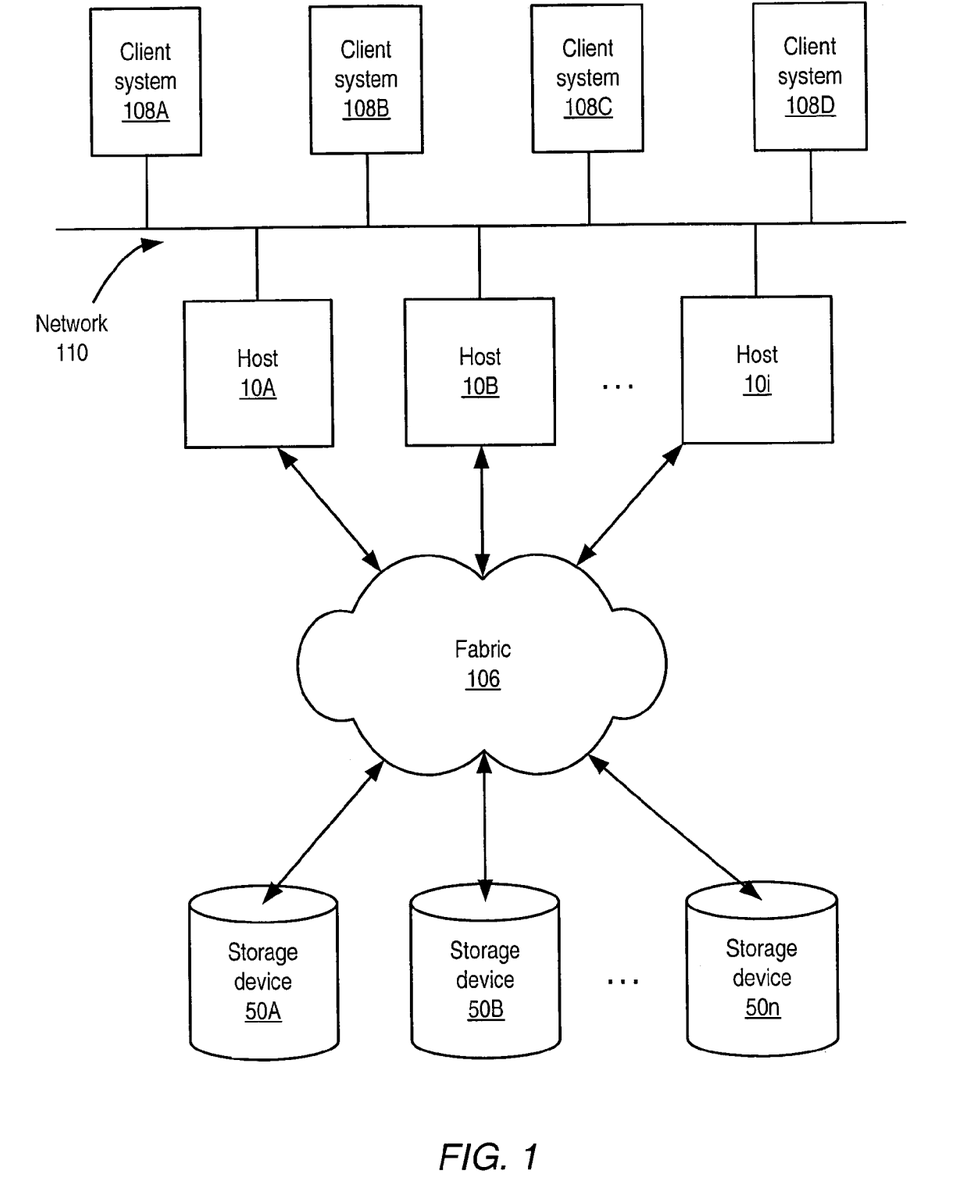
FIG. 1 illustrates a networked computer system, according to one embodiment.

FIG. 1 illustrates an exemplary computer system that may implement a file system buffer cache as described herein, according to one embodiment. In the illustrated embodiment, a storage area network (SAN) environment is formed by one or more hosts 10 (e.g., hosts 10A, 10B and 10i) (which may also be referred to as servers) that are interconnected with one or more associated storage devices 50 (e.g., storage devices 50A, 50B ... 50n) through an interconnect fabric 106. One or more client systems 108A–108D may access the SAN by accessing one or more of the hosts 10 via a network 110. Network 110 may include wired or wireless communication mechanisms such as, for example, Ethernet, LAN (Local Area Network), WAN (Wide Area Network), or modem, among others. As used herein, the term "host" refers to any computing device that includes a memory and a processor configured to execute instructions stored in the memory.

Each of the storage devices 50 may include any of one or more types of storage devices including, but not limited to, storage systems such as RAID (Redundant Array of Independent Disks) systems, disk arrays, JBODs (Just a Bunch Of Disks, used to refer to disks that are not configured according to RAID), tape devices, and optical storage devices. These devices may be products of any of a number of vendors including, but not limited to, Compaq, EMC, and Hitachi. Hosts 10 may run any of a variety of operating systems such as a UNIX operating system, Linux operating system, or a Windows operating system. Each host 10 may be connected to the fabric 106 via one or more Host Bus Adapters (HBAs).

Fabric 106 includes hardware that connects hosts 10 to storage devices 50. The fabric 106 may enable host-to-storage device connectivity through Fibre Channel switching technology. The fabric 106 hardware may include one or more switches (also referred to as fabric switches), bridges, hubs, and/or other devices such as routers, as well as the interconnecting cables (e.g., fiber optic or copper cables for Fibre Channel SANs), as desired.

In one embodiment, the computer system may include a LAN that uses the Network File System (NFS) protocol to provide access to shared files on the LAN. Using NFS, each host 10 may export a logical hierarchy of files (e.g., a directory tree) physically stored on one or more of storage devices 50 and accessible by the client systems 108 through the host 10. These hierarchies of files, or portions or subtrees of the hierarchies of files, are referred to herein as "file systems."

In one embodiment, the SAN components may be organized into one or more clusters to provide high availability, load balancing, and/or parallel processing. For example, in FIG. 1, a selected set of the hosts 10A, 10B . . . 10i may be operated in a cluster configuration.

It is noted that while in the embodiments described above, hosts 10 may be coupled to networked storage devices 50 through a storage area network, other embodiments are possible in which the hosts 10 are coupled to storage devices 50 via the network 110. Furthermore, other embodiments may not include any clients. For example, one embodiment may involve a single host directly connected to storage devices 50.

Figure 2:
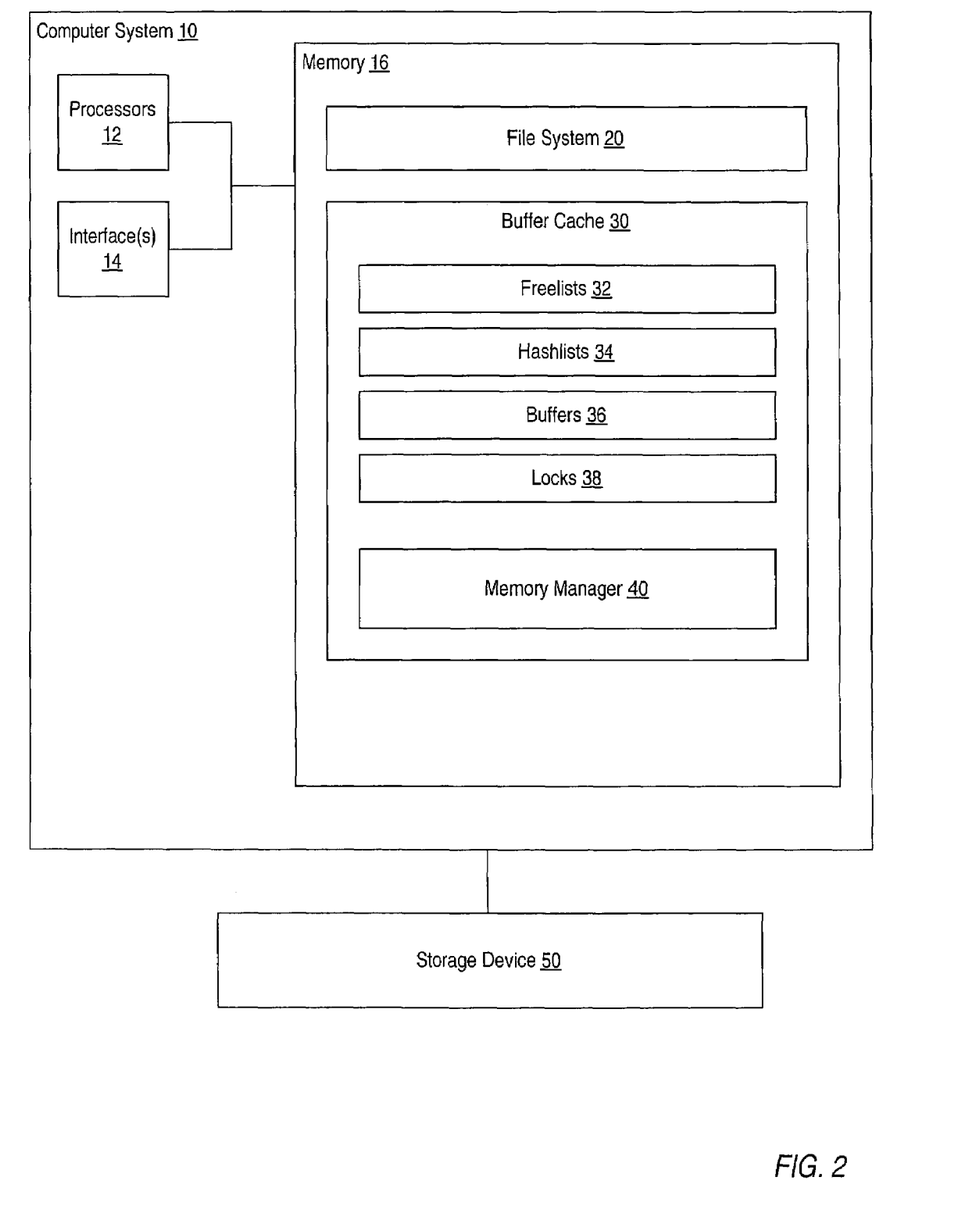
FIG. 2 illustrates a computer system that includes a file system buffer cache, according to one embodiment.

FIG. 2 illustrates a block diagram of a host computer system 10. As illustrated in FIG. 2, each computer system 10 may include various conventional software and hardware components, as desired. A computer system 10 is illustrated with one or more processors 12 as well as a main memory 16 for storing instructions and/or data accessible by the processors 12. Computer systems 10 may also each include one or more interfaces 14 for interfacing with other hosts, clients and/or storage devices 50 via a network 110 and/or for interfacing to storage devices 50 via a SAN, SCSI (Small Computer System Interface), IDE (Integrated Drive Electronics), and/or other interfaces. In one embodiment, main memory 16 may be implemented using dynamic random access memory (DRAM), although it is noted that in other embodiments, other specific types of memory, or combinations thereof, may be utilized.

FIG. 2 further illustrates various software components executable by processors 12 out of a computer accessible medium such as main memory 16. The depicted software components include a file system 20. It is noted that these software components may be paged in and out of main memory 16 from a secondary storage medium (e.g., storage devices 50) according to conventional techniques.

The file system 20 may buffer disk blocks in a buffer cache 30 in memory. The buffer cache 30 may be divided into a group of buffers. Each buffer may be assigned the identity of a disk block stored within that buffer. The file system 20 may manage the contents of buffer cache 30 in order to benefit from temporal locality by storing recently accessed disk blocks in one or more buffers 36 within the buffer cache 30. Accordingly, if these recently accessed disk blocks are needed again, the file system 20 may access the disk blocks in the buffer cache 30 in memory 16 instead of having to retrieve the disk blocks from one or more storage devices 50.

A memory manager 40 in the buffer cache 30 may interact with an operating system (not shown) to manage the allocation of memory 16 to buffer cache 30. For example, memory manager 40 may respond to usage conditions in the buffer cache 30 to release unused memory to the operating system or to request additional memory from the operating system.

The file system 20 may use several freelists 32 and hashlists 34 when accessing (i.e., reading and/or writing) disk blocks cached in buffer cache 30. Freelists 32 may identify which buffers 36 are currently free (i.e., available to be accessed and/or allocated). Hashlists 34 may allow the file system to search for a buffer with a particular identity. For example, if the file system 20 is looking for a particular disk block in the buffer cache 30, the file system 20 may calculate an index for that disk block based on the disk block's identity. The index may select one of several hashlists 34 from a hash table (not shown). The file system 20 may then search the indexed hashlist for a buffer storing the disk block. The freelists and hashlists may be implemented using doubly linked lists, singly linked lists, arrays, or other data structures.

Serializing Access to the Buffer Cache

In order to maintain consistency, the file system 20 may acquire a lock 38 before accessing a hashlist 34, freelist 32, or buffer 36. For example, if processes executing on each of several processors 12 may access buffers via the file system 20, the file system 20 may acquire a lock whenever a buffer is accessed so as to not inadvertently read file system information from the buffer cache 30 as that information is being modified by another process.

A single lock 38 may be associated with a "lock group" of freelists 32, hashlists 34, and buffers 36. In order to access any buffer, freelist, or hashlist within that lock group, the file system 20 may first acquire that lock 38. Once the lock 38 is acquired, the file system 20 may access other buffers, freelists, and/or hashlists in that group without having to reacquire the lock 38. The file system 20 may release the lock 38 (e.g., by clearing a value written to the lock) when the access is complete. Freelists 32, hashlists 34, and buffers 36 may be subdivided into several unique lock groups and thus there may be several associated locks 38. Each freelist 32 and hashlist 34 maps to exactly one lock.

Each freelist 32 may be associated with a different lock 38 than each other freelist 32. In some embodiments, the number of freelists 32 may be proportional to the number of processors 12 in the computer system(s) 10, so that at any given time, each process executing on a given processor 12 may tend to be accessing a different freelist 32 than the processes on other processors 12. Accordingly, having one lock 38 per freelist may allow each processor 12 to obtain a lock without unnecessarily blocking another processor's access to a different freelist 32 while at the same time serializing accesses to the same freelist. Note that the number of freelists may be more or less than the number of processors in some embodiments. For example, the file system 30 may initialize the buffer cache with a number of freelists 32 equal to the minimum of sixteen (or another integer selected based on expected performance) or the number of processors 12 in the system in one embodiment. Restricting the number of freelists 32 may decrease the complexity of searches for free buffers and prevent degradation of buffer cache performance when buffers 36 are reused (e.g., if a least-recently-used algorithm is used to select which buffer to overwrite, an excessive number of freelists may degrade the performance of the least recently used algorithm).

A group of several hashlists 34 may also be associated with each lock 38. Thus, each lock 38 may be associated with one freelist 32 and one or more hashlists 34. In one embodiment, each hashlist 34 may tend to identify a few (e.g., fewer than ten, and in some cases only one or two) buffers. The number of hashlists 34 may be selected to be proportional to the total allowed capacity of the buffer cache 30 divided by the average buffer 36 size. For example, in one embodiment, if the average buffer 36 is 2 Kilobytes in size, the number of hashlists 34 may be selected by dividing the total allowed capacity of the buffer cache, expressed in Kilobytes, by 2.

In some embodiments, the same number of hashlists may be associated with each freelist to form a lock group. To allow hashlists 34 to be symmetrically associated with freelists 32 for lock sharing purposes, the computed number of hashlists (e.g., based on maximum buffer cache 30 size) may be rounded up to the next integer multiple of the number of freelists 32.

Hashlists 34 may be associated with freelists 32 so that hashlists 34 and freelists 32 that are part of the same lock group tend to identify the same subgroup of buffers. This association may be based on how memory is allocated to the buffer cache 30 (buffers from each "pool" of memory allocation, and the hashlists and freelists that correspond to that pool, may be assigned to the same lock group), as described below.

Figure 3:
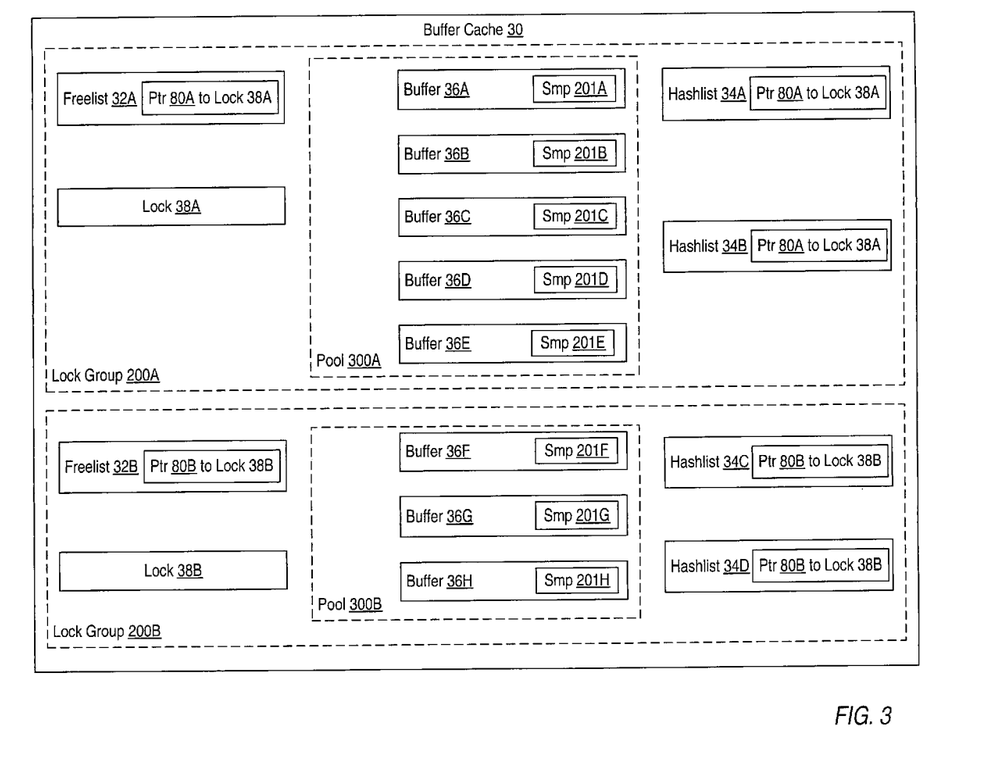
FIG. 3 illustrates a file system buffer cache, according to one embodiment.

FIG. 3 illustrates exemplary contents of buffer cache 30, according to one embodiment. Here, two locks 38A and 38B are each associated with a lock group 200 that includes a freelist 32, several hashlists 34, and several buffers 36. Lock 38A is associated with lock group 200A, which includes freelist 32A, hashlists 34A–34B, and buffers 36A–36E. Lock 38B is associated lock group 200B, which includes freelist 32B, hashlists 34C–34D, and buffers 36F–36H. In this embodiment, each freelist and hashlist includes a pointer 80 to that list's associated lock 38. In alternative embodiments, pointers 80 may not be used to identify locks. For example, the file system may identify the appropriate lock for each freelist and hashlist algorithmically or by using an additional hash function.

Whenever the file system 20 accesses a particular hashlist, such as hashlist 34A, to search for a buffer storing a particular disk block, the file system 20 may first lock the hashlist 34A by acquiring the lock 38A identified in the hashlist's lock pointer 80A. If the buffer is not found in the hashlist 34A, the file system 30 may use a replacement algorithm such as least recently used replacement to select a buffer, such as buffer 36C, identified in the corresponding freelist 32A, reallocate the selected buffer to that item of file system information, and add the buffer 36C to the hashlist 34A (e.g., by adding a pointer to the buffer 36C to the hashlist 34A). If a corresponding buffer is found in the hashlist 34A, the file system 20 may verify that the corresponding buffer is on the associated freelist 32A and, if so, remove the buffer from the freelist and return the buffer to a requesting process. Since the same lock protects the freelist 32A and the hashlist 34C, the file system 20 only needs to acquire one lock 38A to access both lists. The file system 20 may release the lock 38A upon returning the buffer to the requesting process or upon failure to locate an appropriate buffer, in which case the requesting process may retry its request at a later time.

In some embodiments, each buffer 36 may additionally be protected by a semaphore ("Smp" in FIG. 3) 201. As shown in FIG. 3, each buffer 36 may include its own semaphore 201. The file system 20 may acquire a lock on a buffer 36 prior to returning that buffer to a requesting process by both acquiring the lock 38 on the freelist 32 and/or hashlist 34 associated with that buffer 36 (which the file system 20 would already be holding in order to have found the buffer in the hashlist) and updating the value of the buffer's semaphore 201. In some embodiments, the semaphore may be implemented as a spin lock or spin lock-like primitive. The semaphore 201 may be protected by the lock 38 on the corresponding freelist and hashlist.

The semaphore 201 may provide shared (read-only) or exclusive (read or write) locking in some embodiments. For example, the semaphore 201 may be implemented using a counter. When the buffer 36 is not locked, the counter value may be zero. Thus, when a shared lock is held on the buffer 36, the counter value may be equal to a value greater than zero. Each time the file system 20 acquires a shared lock on the buffer, the file system 20 may increment the counter (assuming the counter previously indicated that the buffer was locked in shared mode or unlocked). When the buffer is locked in exclusive mode, the counter value may equal negative one. Thus, a buffer's lock may be acquired by acquiring the lock 38 on the appropriate freelist or hashlist and updating the counter as needed. Other embodiments may implement shared or exclusive locking in different ways or may alternatively implement mutual exclusion locking.

The file system 30 may include buffer locking and unlocking routines to update the buffer semaphores 201. When a buffer identified on a freelist is locked, the buffer locking routine may also remove that buffer from the freelist. When such a buffer is unlocked, the buffer unlocking routine may return the buffer to the freelist. If shared and exclusive buffer locks are available, these routines may include a parameter that indicates whether the buffer is being locked in shared or exclusive mode. When a file system process requests a buffer in shared mode, the buffer locking routine may return the buffer in either shared or exclusive mode. However, when a file system process requests a buffer in exclusive mode, the buffer locking routine may not return the buffer in shared mode.

Figure 4:
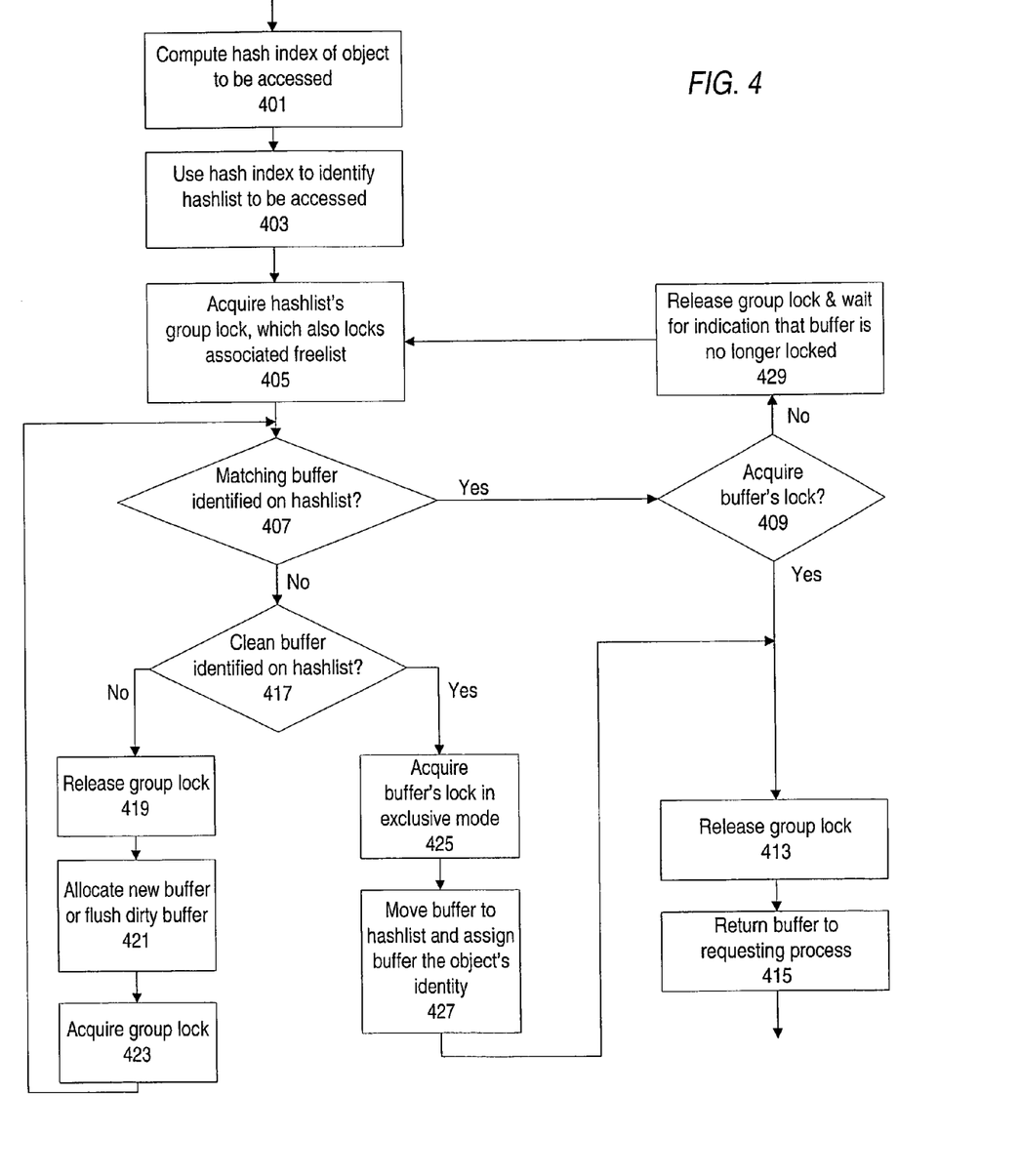
FIG. 4 shows one embodiment of a method of accessing a file system buffer cache.

FIG. 4 illustrates one embodiment of a method of accessing file system information from a buffer in a buffer cache. At 401, the hash index of an object (e.g., a disk block) to be accessed in the buffer cache is calculated. This hash index identifies the hashlist in the buffer cache to search for the desired buffer, as indicated at 403. The hashlist belongs to a lock group that has an associated group lock. The lock group to which the hashlist belongs may be identified by a pointer to the group lock included in the hashlist. Alternatively, the lock group to which the hashlist belongs may be identified algorithmically or by using a hashing function. In order to access the hashlist, the hashlist's group lock is acquired, as indicated at 405. Acquiring the group lock also locks a corresponding freelist and may lock one or more other hashlists.

Once the hashlist identified at 403 is locked by locking the group lock, the hashlist may be searched for a buffer corresponding to the desired object (e.g., disk block). If a matching buffer is found, as determined at 407, an attempt to lock the buffer may be attempted. If the lock attempt successfully locks the buffer, as determined at 409, the group lock may be released, as shown at 413, and the locked buffer may be returned to the requesting process, as shown at 415. Note that acquisition of the buffer lock may also remove the buffer from the freelist. Also note that in some embodiments, the lock on the buffer may be acquired in one of several modes. Successfully acquiring the lock may require acquisition of the lock in a desired mode (e.g., if a shared or exclusive lock already exists on the buffer, an exclusive lock may not be successfully acquired). If the buffer's lock cannot be acquired (e.g., because the buffer is already locked), the process may release the group lock and wait for an indication that the buffer is no longer locked, as shown at 429, before reacquiring the group lock at 405.

If no matching buffer is found in the hashlist, as determined at 407, the freelist in the hashlist's lock group may be searched for a clean buffer, as indicated at 417. If a clean buffer is found, the buffer may be locked in exclusive mode, as shown at 425. At 427, the buffer may then be assigned the identity of the object (e.g., disk block), and the buffer may be moved to the hashlist identified at 403. Processing may continue as indicated at 413–415. At 415, the buffer may be marked as empty when it is returned to the requesting process. Note that the use of lock groups may avoid having to juggle locks or to release and acquire different locks when assigning a new identity to a buffer. For example, since the group lock on the hashlist acquired at 405 also locks the associated freelist, the freelist can be searched for a clean buffer at 417 without having to release the hashlist lock and/or acquire a different lock on the freelist.

If no clean buffers are available in the freelist, as determined at 417, the group lock may be released, as shown at 419. A new buffer may be allocated to the freelist or a dirty buffer on the freelist may be flushed, as indicated at 421. Then, the group lock may be reacquired, as shown at 423, and the hashlist may again be searched for a matching buffer.

Handling Multiple Buffer Sizes & Buffer Allocation

In some embodiments, the file system 20 may support multiple different buffer sizes within the buffer cache 30. In such embodiments, each freelist 32 may be subdivided into multiple sub-freelists. Each sub-freelist may correspond to a particular buffer size. Accordingly, to find a free buffer of a desired size, file system 30 may access a freelist 32, identify which sub-freelist in that freelist has buffers that are the desired buffer size (or at least as large as the desired buffer size), and search the identified sub-freelist for a free buffer. In one embodiment, each freelist may include a sub-freelist corresponding to each of the following buffer sizes: 1K, 2K, 4K, 8K, and 64K. Other embodiments may support different and/or additional buffer sizes.

Figure 5:
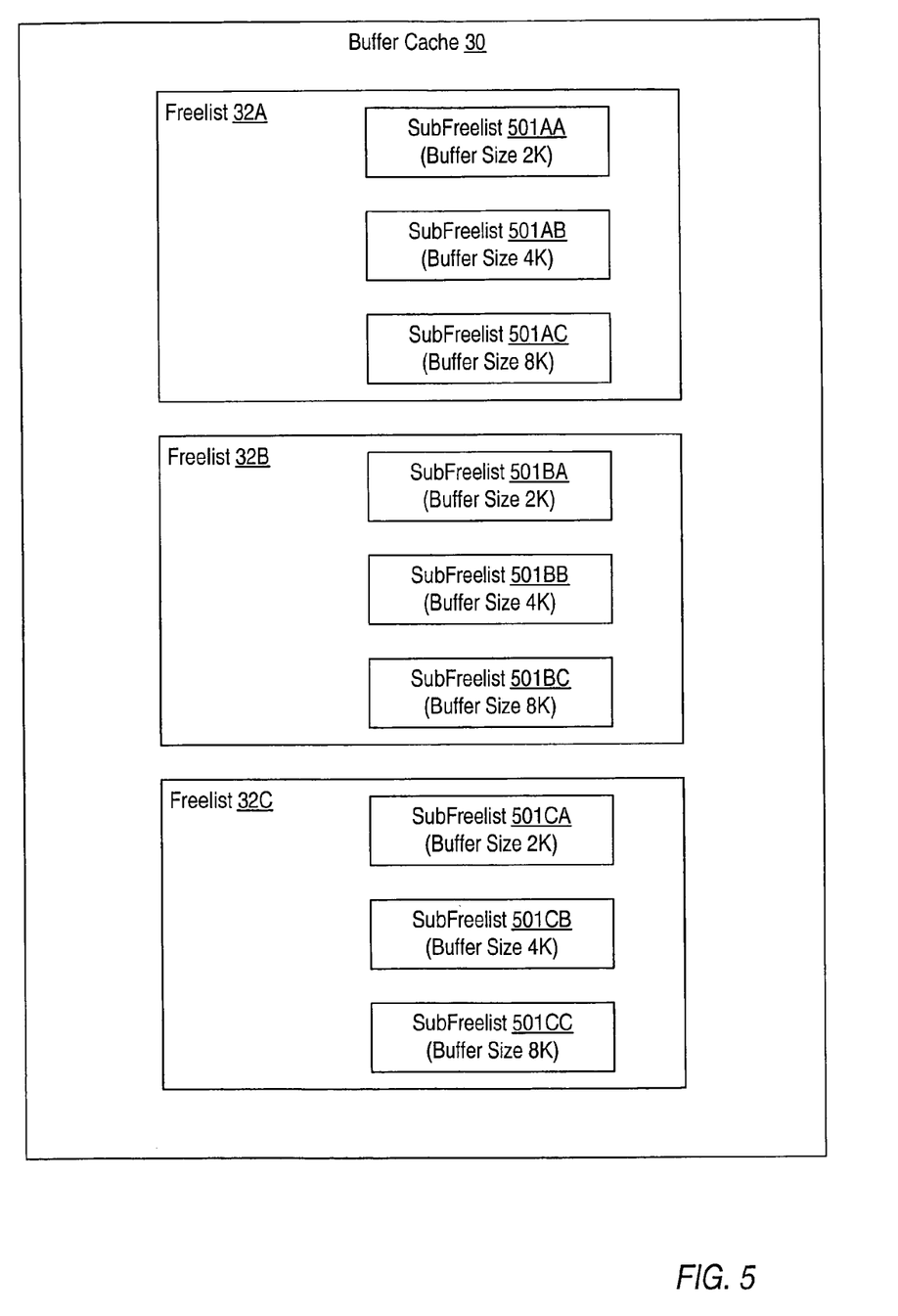
FIG. 5 illustrates a file system buffer cache, according to another embodiment.

FIG. 5 illustrates how freelists in the buffer cache 30 may be subdivided into sub-freelists, according to one embodiment. Three freelists 32A–32C are each subdivided into three sub-freelists 501. Each sub-freelist corresponds to a particular buffer size. For example, sub-freelists 501AA, 501BA, and 501CA each correspond to a 2K buffer size. Similarly, sub-freelists 501AB, 501BB, and 501CB correspond to a 4K buffer size and sub-freelists 501AC, 501BC, and 501CC correspond to an 8K buffer size. Whenever the file system 20 searches one of the freelists 32A–32C for a buffer of a particular size, the file system 20 may identify which sub-freelist 501 included in that freelist 32 identifies buffers having that size and limit its search to that sub-freelist 501. Accordingly, the file system's searches for buffers within a freelist may be limited to searching the portion of the freelist that corresponds to the desired buffer size.

Whenever a file system process needs to allocate a buffer 36 to store a disk block, that process may request a buffer having a particular size. If that size does not correspond to one of the supported buffer sizes, a file system 20 allocation process may round that size up to the next largest supported buffer size, access a sub-freelist 501 corresponding to that buffer size, and select a buffer (e.g., the least recently used buffer of a group of sufficiently aged buffers on that sub-freelist) to return to the requesting process. If none of the buffers on the appropriate sub-freelist are available for reallocation (e.g., if none of the buffers on the sub-freelist are sufficiently aged to qualify for least-recently-used replacement), the allocation process may attempt to acquire more memory for use with that sub-freelist.

In an alternative embodiment, all or some sub-freelists 501 may correspond to a particular range of buffer sizes. For example, one sub-freelist may correspond to buffers that are sized between 8K and 64K. In such embodiments, the appropriate sub-freelist to access may be determined based on the buffer size range in which a requested buffer size belongs.

A buffer cache memory manager 40 may request more memory from the operating system whenever more buffer cache memory is needed, up to a total allowed buffer cache capacity. The memory manager 40 may be configured to request memory allocations from the operating system in one or more uniform sizes. For example, in one embodiment, the memory manager 40 may request memory allocations of 64K and 8K. The number of different sizes of memory allocations may be fewer than the number of different supported buffer sizes.

The memory allocated to the buffer cache 30 by the operating system in response to a single request from the memory manager 40 is referred to herein as a "slab." The memory manager 40 may subdivide each slab of memory into one or more buffers 36 of the same size. For example, if an 8K slab is requested from the operating system in response to a process requesting a 2K buffer, the 8K slab may be assigned a 2K buffer size. Four 2K buffers may be allocated from the 8K slab. Note that in some embodiments, slabs may be assigned ranges of buffer sizes instead of discrete buffer sizes.

The memory manager 40 may track the slab to which each buffer belongs. For example, each time a buffer is allocated from a slab, the memory manager 40 may add that buffer to a list associated with the slab. The buffer may also include information identifying the slab to which that buffer belongs in some embodiments.

The memory manager 40 may associate several slabs, at least some of which are allocated to different buffer sizes, to form a "pool." A freelist 32 (and its sub-freelists, if any) and several hashlists 34 may be assigned to each pool. Freelists 32 and hashlists 34 may be associated into lock groups 200 for lock sharing purposes by pools such that each freelist 32 and hashlist 34 that share the same lock identify buffers formed from in the same pool. For example, looking back at FIG. 3, each buffer 36 protected by the same lock group's lock 38 is included in the same pool 300. The freelist 32 and hashlists in each lock group 200 are also associated with the same pool 300. Freelists 32 and hashlists 34 in different lock groups 200 are associated with different pools 300.

When the buffer cache 30 is initialized, the memory manager 40 may establish a number of pools based on the number of processors in the system. For example, the number of pools may be the same as the number of freelists, calculated as described above with respect to calculating the number of freelists. Alternatively, the number of pools, and thus the number of freelists, may be selected as the nearest prime number larger than the number of processors 12 in the system (a maximum prime number may be specified to avoid an undesirably large number of pools in some embodiments). At buffer cache 30 initialization, none of the pools may include any slabs.

As file system 20 requests buffers, memory manager 40 may request slabs from the operating system, allocate those slabs to pools, subdivide the slabs into buffers, and return the buffers to the requesting process. Each request for a buffer from a particular calling process may include information identifying the pool from which that calling process is requesting a buffer. For example, the pool may be identified by determining which lock group includes the hashlist 34 corresponding to the disk block to be cached in the requested buffer. The memory manager 40 may use this information to identify the pool in which to allocate a buffer for the calling process to use.

Whenever a slab is allocated to a pool, the memory manager 40 may assign that slab a particular buffer size. The memory manager 40 may subdivide the slab into buffers of the assigned buffer size and place each of these buffers on the freelist associated with that pool. For example, the memory manager may place all of the buffers on the appropriate sub-freelist 501 within the pool's freelist 32 upon allocating the slab to the pool. One of the buffers from the slab may be returned to the requesting process whose request initiated the slab allocation. The remaining buffers from that slab may be identified as being available to be assigned a new identity of a requested data object not already stored in the buffer cache (e.g., by indicating that the buffers are among the least recently used buffers in the freelist and that the buffers are sufficiently aged for reassignment). In embodiments such as this, a slab may be described as being fully available when all of the component buffers in that slab are sufficiently aged for reassignment.

In an alternative embodiment, whenever a slab is allocated to a pool, the identity of a requested data object may be assigned to one buffer from that slab and that buffer may be placed on the appropriate hashlist and returned to a calling process that initiated the slab allocation. In such an embodiment, if the assigned buffer size is less than the size of the slab, the other buffers may be allocated from the slab at a later time. In order to utilize the remaining portions of each slab, the memory manager may track how much of each slab is currently in use. For example, the memory manager may maintain a slab-available-space counter for each slab that indicates how many buffers of the buffer size assigned to that slab are currently available for allocation. Slabs may be described as fully available (e.g., no buffers are currently allocated from that slab), partially available (e.g., at least one buffer is available to be allocated from that slab), and unavailable (e.g., no buffers are available to be allocated from that slab).

As buffers 36 are no longer needed, those buffers may be released back to the operating system. The memory manager 40 may control the release of memory from the buffer cache 30 such that either all of the buffers in a given slab are released or none of the buffers in a given slab are released. In embodiments that track the available buffers within each slab, a buffer may be individually released back to a slab by removing the buffer from the sub-freelist 501 and increasing the number of buffers available within the slab.

The memory manager 40 may occasionally search for fully available slabs that can be released back to the operating system. For example, the memory manager 40 may search each sub-freelist 501 to identify slabs in which all of the component buffers are sufficiently aged for reassignment. The memory manager 40 may also reassign buffer identities of buffers that are less frequently accessed to buffers within the same slab so that when that slab is freed, the slab is likely to contain only buffers that have not been recently accessed. In embodiments using slab-available-space counters, the memory manager 40 may search for slabs whose slab-available-space counters indicate that no buffers are currently allocated from those slabs and release those slabs back to the operating system. In some embodiments, the memory manager 40 may track how long each slab is fully available and only release those slabs that have been fully available for at least a minimum duration.

By handling buffer cache 30 in slabs instead of individually requesting and releasing buffers from the operating system, memory fragmentation due to operation of the buffer cache 30 may be reduced. Also, the memory manager 40 may more accurately track how much memory is currently allocated to buffer cache by identifying how many slabs of each slab size are currently allocated.

Figure 6:
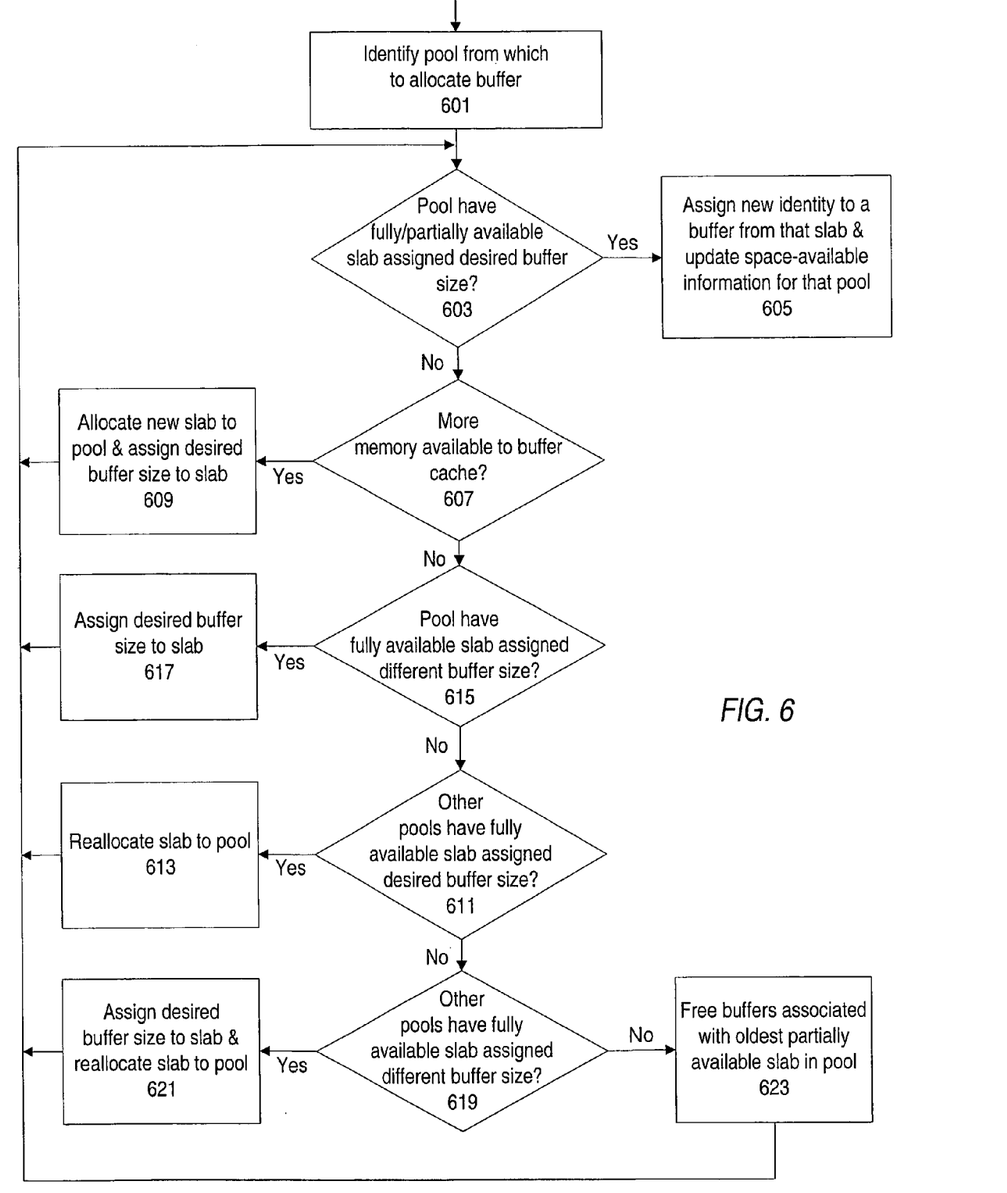
FIG. 6 shows one embodiment of a method of allocating buffers in a file system buffer cache.

FIG. 6 illustrates one embodiment of a method of allocating buffers using slab allocation within a file system buffer cache. At 601, the pool from which a buffer should be allocated is determined. If the identified pool has a fully or partially available slab that is assigned the desired buffer size, as determined at 603, a buffer from that slab may be assigned a new identity, as shown at 605, and returned to a requesting process. If all of the buffers in slabs are not immediately placed on the freelist when slabs are allocated to pools, function 605 may also involve allocating a buffer from the slab before assigning a new identity to the buffer. Information indicating how many buffers remain to be allocated from that pool may also be updated at 605. In embodiments that track how many buffers from each slab are allocated, the number of buffers allocated in the slab may also be updated at 605.

If no slab of the desired buffer size allocated to the pool has buffers available and more memory is available for the buffer cache (i.e., the buffer cache has not reached its maximum capacity yet), as determined at 607, another slab of memory may be requested from the operating system. This slab may be allocated to the pool identified at 601 and assigned the buffer size of the desired buffer, as shown at 609. Then, one or more buffers from this slab may be allocated.

If the buffer cache is already at its maximum size, as determined at 607, the pool identified at 601 may be searched for any fully available slabs of other buffer sizes, as shown at 615. If a fully available slab is found within that pool, the slab may be reassigned the desired buffer size, as shown at 617, and one or more buffers may be allocated from this slab. This may involve dropping a lock acquired on the first pool's lock group and acquiring a lock on the other pool's lock group in order to search the other pool for slabs and/or to reallocate the slab to the first pool.

If the pool identified at 601 does not include any fully available slabs, other pools' slabs may be checked to see if any other pool has a fully available slab of the desired buffer size, as shown at 611. If so, that slab may be reallocated, as indicated at 613, to the pool identified at 601. One or more buffers may be allocated from the reallocated slab.

If no other pool has a fully available slab associated with the desired buffer size, the other pools may be searched for fully available slabs, as indicated at 619. If a fully available slab is found, the slab may be reallocated to the pool identified at 601 and reassigned the desired buffer size, as shown at 621. Then, a buffer may be allocated from this slab.

If no fully available slabs are found in any of the pools, the slab that includes the oldest (most aged with respect to a least recently used algorithm) buffer in the pool identified at 601 may be released back to the operating system, as shown at 623, in order to free memory for reallocation to the buffer cache. Freeing the slab may involve identifying each buffer in the slab and writing data stored in any dirty buffers back to disk or reallocating a buffer from another slab to store the data in any dirty buffers. If no slab is available for release within the pool identified at 601, additional pools may be searched for a slab to release (not shown).

Note that while the above description has focused on embodiments involving a file system and file system buffer cache, other embodiments may involve different types of caches. For example, alternative embodiments may involve other types of caches including a DNLC (Directory Name Lookup Cache), inode cache, or page cache. Similarly, some embodiments may involve a cache of database objects maintained and accessed by a database. Generally, these various types of caches may each contain objects, and freelists and hashlists may be used to track these objects. As used herein, "objects" are uniquely identifiable data or metadata objects. For example, the objects that make up a buffer cache are referred to above as buffers, and each buffer is assigned the unique identity of a disk block stored within that buffer. A DNLC may cache filename objects, an inode cache may cache inode objects, and a page cache may cache page objects. Within a cache, freelists identify objects that are available for reuse. An object is placed on particular hashlist based on a hash of the object's identity. Hashlists may be used to increase the efficiency of searches for objects within a cache.

Returning to FIG. 1, note that each client system 108 and/or host 10 may take various forms, including a workstation, server, mainframe computer system, network appliance, network computer, Internet appliance, personal digital assistant (PDA), embedded device, smart phone, television system, another suitable device, or combinations thereof.

Additionally, note that all or part of a file system application 30 may be stored on various computer accessible media, such as storage devices 50. Examples of computer accessible media include hard disk storage, floppy disk storage, removable disk storage, flash memory, punch cards, magneto-optical storage, MEMs, magnetic core, and random access memory (RAM). Various embodiments may further include receiving, sending or storing instructions and/or data implemented in accordance with the foregoing description upon a computer accessible medium. A computer accessible medium may include a communication medium such as network and/or a wireless link on which communication signals such as electrical, electromagnetic, or digital signals are conveyed.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A computer-implemented method, comprising:
    establishing a cache comprising a plurality of memory pools, wherein each memory pool comprises a plurality of buffers of different sizes;
    assigning a freelist comprising a plurality of sub-freelists to each memory pool of the cache, wherein at least one sub-freelist of a given freelist is configured to include one or more buffers of at least a first size, and wherein at least another sub-freelist of the given freelist is configured to include one or more buffers of at least a second size different from the first size;
    selecting a particular memory pool of the plurality of memory pools to store a cached version of a given data object, wherein said selecting is performed based at least in part on an index value derived from the given data object;
    in response to a request for a free buffer of a desired size from the particular memory pool to store the cached version of the given data object:
        identifying a particular sub-freelist of the freelist assigned to the particular memory pool, wherein the particular sub-freelist is configured to include buffers of at least the desired size; and
        searching the particular sub-freelist to obtain a free buffer of at least the desired size.

2. The method as recited in claim 1, further comprising:
    assigning the freelist of each memory pool of cache to a respective lock group associated with a respective lock of a plurality of locks, wherein the lock protects access to the freelist and one or more buffers of the memory pool.

3. The method as recited in claim 2, wherein at least some of the one or more buffers are included in one or more hashlists of the lock group, wherein the lock further protects access to the one or more hashlists.

4. The method as recited in claim 1, further comprising:
    acquiring one or more slabs of memory to be used for the particular memory pool, wherein each slab corresponds to a chunk of memory returned by an operating system in response to a single request for memory; and
    designating each slab of the one or more slabs to be used to allocate one or more buffers of a respective size or a respective set of sizes within the particular memory pool.

5. The method as recited in claim 4, further comprising:
    in response to a request to allocate a buffer of a specified size from the particular memory pool, determining whether the particular memory pool includes a particular slab designated to be used to allocate buffers of one or more sizes including the specified size and having sufficient unallocated memory for the buffer; and
    if the particular memory pool includes a particular slab designated to be used to allocate buffers of one or more sizes including the specified size and having sufficient unallocated memory for the buffer, allocating the buffer of the specified size from the particular slab.

6. The method as recited in claim 5, further comprising:
    if the particular memory pool does not include a slab designated to be used to allocate buffers of one or more sizes including the specified size and having sufficient unallocated memory for the buffer, determining whether the cache has reached a maximum capacity; and
    if the cache has not yet reached the maximum capacity, requesting a new slab from an operating system, assigning the new slab to the particular memory pool, designating the new slab to be used to allocate buffers of one or more sizes including the specified size and allocating the buffer of the specified size from the new slab.

7. The method as recited in claim 6, further comprising:
    if the cache has reached the maximum capacity, determining whether the particular memory pool includes a fully available slab from which no buffers have yet been allocated; and if the particular memory pool includes a fully available slab from which no buffers have yet been allocated, designating the fully available slab to be used to allocate buffers of one or more sizes including the specified size and allocating the buffer of the desired size from the fully available slab.

8. The method as recited in claim 7, further comprising:
if the particular memory pool does not include a fully available slab from which no buffers have yet been allocated, determining whether an other memory pool of the cache includes a fully available slab from which no buffers have yet been allocated; and
if an other memory pool includes a fully available slab, re-assigning the fully available slab from the other memory pool to the particular memory pool, designating the fully available slab to be used to allocate buffers of one or more sizes including the specified size and allocating the buffer of the specified size from the fully available slab.

9. The method as recited in claim 8, wherein said determining whether an other memory pool of the cache includes a fully available slab comprises:
searching for a fully available slab designated for buffers of one or more sizes including the specified size in one or more other memory pools of the cache;
if a fully available slab designated for buffers of one or more sizes including the specified size is found, selecting the fully available slab for re-assignment to the particular memory pool;
if a fully available slab designated for buffers of one or more sizes including the specified size is not found, searching for a fully available slab designated for buffers of one or more other sizes excluding the specified size in the one or more other memory pools of the cache; and
if a fully available slab designated for buffers of one or more other sizes excluding the specified size is found in an other memory pool, selecting the fully available slab designated for buffers of one or more other sizes excluding the specified size for re-assignment to the particular memory pool.

10. The method as recited in claim 8, further comprising:
if no other memory pool of the cache includes a fully available slab, selecting a target slab of the particular memory pool for reallocation;
releasing the target slab to the operating system; and
requesting an additional slab from the operating system, assigning the additional slab to the particular memory pool, designating the additional slab to be used to allocate buffers of one or more sizes including the specified size and allocating the buffer of the specified size from the additional slab.

11. The method as recited in claim 1, further comprising:
determining, based at least in part on a number of processors included in a computer system at which the cache is to be incorporated, the number of memory pools to be included in the cache.

12. A computer-implemented method, comprising:
designating a respective lock of a plurality of locks to protect access to each of a plurality of lock groups of objects implementing a cache, wherein each lock group comprises a freelist and one or more hashlists;
acquiring a lock of the plurality of locks, wherein acquiring the lock locks a freelist and one or more hashlists included in an associated lock group of the plurality of lock groups.

13. The method of claim 12, wherein each hashlist of the one or more hashlists of a lock group comprises a pointer to the lock associated with the lock group.

14. The method of claim 12, wherein each freelist of a lock group comprises a pointer to the lock associated with the lock group.

15. The method of claim 12, wherein each hashlist of the one or more hashlists comprises one or more buffers, further comprising:
in response to a data access request from a requester:
identifying a particular hashlist of the cache to be searched for a buffer comprising a cached version of the data identified in the data access request;
acquiring the lock associated with the lock group corresponding to the particular hashlist;
searching the particular hashlist for the buffer;
in response to finding the buffer comprising the cached version in the hashlist, acquiring a lock on the buffer, releasing the lock associated with the lock group and returning the buffer to a requester.

16. A system, comprising:
one or more processors;
a memory coupled to the one or more processors, wherein the memory stores program instructions executable by the one or more processors to:
establish a cache comprising a plurality of memory pools, wherein each memory pool comprises a plurality of buffers of different sizes;
assign a freelist comprising a plurality of sub-freelists to each memory pool of the cache, wherein at least one sub-freelist of a given freelist is configured to include one or more buffers of at least a first size, and wherein at least another sub-freelist of the given freelist is configured to include one or more buffers of at least a second size different from the first size;
select a particular memory pool of the plurality of memory pools to store a cached version of a given data object, wherein said selecting is performed based at least in part on an index value derived from the given data object;
in response to a request for a free buffer of a desired size from the particular memory pool to store the cached version of the given data object:
identify a particular sub-freelist of the freelist assigned to the particular memory pool, wherein the particular sub-freelist is configured to include buffers of at least the desired size; and
search the particular sub-freelist to obtain a free buffer of at least the desired size.

17. The system as recited in claim 16, wherein the instructions are further executable to:
assign the freelist of each memory pool of cache to a respective lock group associated with a respective lock of a plurality of locks, wherein the lock protects access to the freelist and one or more buffers of the memory pool.

18. The system as recited in claim 17, wherein at least some of the one or more buffers are included in one or more hashlists of the lock group, wherein the lock further protects access to the one or more hashlists.

19. The system as recited in claim 16, wherein the instructions are further executable to:
acquire one or more slabs of memory to be used for the particular memory pool, wherein each slab corresponds to a chunk of memory returned by an operating system in response to a single request for memory; and designate each slab of the one or more slabs to be used to allocate one or more buffers of a respective size or a respective set of sizes within the particular memory pool.

20. The system as recited in claim 19, wherein the instructions are further executable to:
in response to a request to allocate a buffer of a specified size from the particular memory pool, determine whether the particular memory pool includes a particular slab designated to be used to allocate buffers of one or more sizes including the specified size and having sufficient unallocated memory for the buffer; and
if the particular memory pool includes a particular slab designated to be used to allocate buffers of one or more sizes including the specified size and having sufficient unallocated memory for the buffer, allocate the buffer of the specified size from the particular slab.

21. The system as recited in claim 20, wherein the instructions are further executable to:
if the particular memory pool does not include a slab designated to be used to allocate buffers of one or more sizes including the specified size and having sufficient unallocated memory for the buffer, determine whether the cache has reached a maximum capacity; and
if the cache has not yet reached the maximum capacity, requesting a new slab from an operating system, assign the new slab to the particular memory pool, designate the new slab to be used to allocate buffers of one or more sizes including the specified size and allocate the buffer of the specified size from the new slab.

22. The system as recited in claim 21, wherein the instructions are further executable to:
if the cache has reached the maximum capacity, determine whether the particular memory pool includes a fully available slab from which no buffers have yet been allocated; and
if the particular memory pool includes a fully available slab from which no buffers have yet been allocated, designate the fully available slab to be used to allocate buffers of one or more sizes including the specified size and allocate the buffer of the desired size from the fully available slab.

23. The system as recited in claim 22, wherein the instructions are further executable to:
if the particular memory pool does not include a fully available slab from which no buffers have yet been allocated, determine whether an other memory pool of the cache includes a fully available slab from which no buffers have yet been allocated; and
if an other memory pool includes a fully available slab, re-assign the fully available slab from the other memory pool to the particular memory pool, designate the fully available slab to be used to allocate buffers of one or more sizes including the specified size and allocate the buffer of the specified size from the fully available slab.

24. The system as recited in claim 23, wherein said determining whether an other memory pool of the cache includes a fully available slab comprises:
searching for a fully available slab designated for buffers of one or more sizes including the specified size in one or more other memory pools of the cache;
if a fully available slab designated for buffers of one or more sizes including the specified size is found, selecting the fully available slab for re-assignment to the particular memory pool;
if a fully available slab designated for buffers of one or more sizes including the specified size is not found, searching for a fully available slab designated for buffers of one or more other sizes excluding the specified size in the one or more other memory pools of the cache; and
if a fully available slab designated for buffers of one or more other sizes excluding the specified size is found in an other memory pool, selecting the fully available slab designated for buffers of one or more other sizes excluding the specified size for re-assignment to the particular memory pool.

25. The system as recited in claim 23, wherein the instructions are further executable to:
if no other memory pool of the cache includes a fully available slab, select a target slab of the particular memory pool for reallocation;
release the target slab to the operating system; and
request an additional slab from the operating system, assign the additional slab to the particular memory pool, designate the additional slab to be used to allocate buffers of one or more sizes including the specified size and allocate the buffer of the specified size from the additional slab.

26. The system as recited in claim 16, wherein the instructions are further executable to:
determine the number of memory pools to be included in the cache based at least in part on the number of processors included in the one or more processors.

27. A tangible, computer-readable medium comprising program instructions, wherein the instructions are computer-executable to:
establish a cache comprising a plurality of memory pools, wherein each memory pool comprises a plurality of buffers of different sizes;
assign a freelist comprising a plurality of sub-freelists to each memory pool of the cache, wherein at least one sub-freelist of a given freelist is configured to include one or more buffers of at least a first size, and wherein at least another sub-freelist of the given freelist is configured to include one or more buffers of at least a second size different from the first size;
select a particular memory pool of the plurality of memory pools to store a cached version of a given data object, wherein said selecting is performed based at least in part on an index value derived from the given data object;
in response to a request for a free buffer of a desired size from the particular memory pool to store the cached version of the given data object:
identify a particular sub-freelist of the freelist assigned to the particular memory pool, wherein the particular sub-freelist is configured to include buffers of at least the desired size; and
search the particular sub-freelist to obtain a free buffer of at least the desired size.

28. The computer-readable medium as recited in claim 27, wherein the instructions are further executable to:
assign the freelist of each memory pool of cache to a respective lock group associated with a respective lock of a plurality of locks, wherein the lock protects access to the freelist and one or more buffers of the memory pool.

29. The computer-readable medium as recited in claim 28, wherein at least some of the one or more buffers are included in one or more hashlists of the lock group, wherein the lock further protects access to the one or more hashlists.

30. The computer-readable medium as recited in claim 27, wherein the instructions are further executable to:
  acquire one or more slabs of memory to be used for the particular memory pool, wherein each slab corresponds to a chunk of memory returned by an operating system in response to a single request for memory; and
  designate each slab of the one or more slabs to be used to allocate one or more buffers of a respective size or a respective set of sizes within the particular memory pool.

31. The computer-readable medium as recited in claim 30, wherein the instructions are further executable to:
  in response to a request to allocate a buffer of a specified size from the particular memory pool, determine whether the particular memory pool includes a particular slab designated to be used to allocate buffers of one or more sizes including the specified size and having sufficient unallocated memory for the buffer; and
  if the particular memory pool includes a particular slab designated to be used to allocate buffers of one or more sizes including the specified size and having sufficient unallocated memory for the buffer, allocate the buffer of the specified size from the particular slab.

32. The computer-readable medium as recited in claim 31, wherein the instructions are further executable to:
  if the particular memory pool does not include a slab designated to be used to allocate buffers of one or more sizes including the specified size and having sufficient unallocated memory for the buffer, determine whether the cache has reached a maximum capacity; and
  if the cache has not yet reached the maximum capacity, requesting a new slab from an operating system, assign the new slab to the particular memory pool, designate the new slab to be used to allocate buffers of one or more sizes including the specified size and allocate the buffer of the specified size from the new slab.

33. The computer-readable medium as recited in claim 32, wherein the instructions are further executable to:
  if the cache has reached the maximum capacity, determine whether the particular memory pool includes a fully available slab from which no buffers have yet been allocated; and
  if the particular memory pool includes a fully available slab from which no buffers have yet been allocated, designate the fully available slab to be used to allocate buffers of one or more sizes including the specified size and allocate the buffer of the desired size from the fully available slab.

34. The computer-readable medium as recited in claim 33, wherein the instructions are further executable to:
  if the particular memory pool does not include a fully available slab from which no buffers have yet been allocated, determine whether an other memory pool of the cache includes a fully available slab from which no buffers have yet been allocated; and
  if an other memory pool includes a fully available slab, re-assign the fully available slab from the other memory pool to the particular memory pool, designate the fully available slab to be used to allocate buffers of one or more sizes including the specified size and allocate the buffer of the specified size from the fully available slab.

35. The computer-readable medium as recited in claim 34, wherein said determining whether an other memory pool of the cache includes a fully available slab comprises:
  searching for a fully available slab designated for buffers of one or more sizes including the specified size in one or more other memory pools of the cache;
  if a fully available slab designated for buffers of one or more sizes including the specified size is found, selecting the fully available slab for re-assignment to the particular memory pool;
  if a fully available slab designated for buffers of one or more sizes including the specified size is not found, searching for a fully available slab designated for buffers of one or more other sizes excluding the specified size in the one or more other memory pools of the cache; and
  if a fully available slab designated for buffers of one or more other sizes excluding the specified size is found in an other memory pool, selecting the fully available slab designated for buffers of one or more other sizes excluding the specified size for re-assignment to the particular memory pool.

36. The computer-readable medium as recited in claim 34, wherein the instructions are further executable to:
  if no other memory pool of the cache includes a fully available slab, select a target slab of the particular memory pool for reallocation;
  release the target slab to the operating system; and
  request an additional slab from the operating system, assign the additional slab to the particular memory pool, designate the additional slab to be used to allocate buffers of one or more sizes including the specified size and allocate the buffer of the specified size from the additional slab.

37. The computer-readable medium as recited in claim 27, wherein the instructions are further executable to:
  determine the number of memory pools to be included in the cache based at least in part on a number of processors included in a computer system at which the cache is to be incorporated.

* * * * *